(12) United States Patent
Artin

(10) Patent No.: US 10,670,063 B2
(45) Date of Patent: Jun. 2, 2020

(54) HOLD OPEN ROD LOCKING MECHANISM

(71) Applicant: HARTWELL CORPORATION, Placentia, CA (US)

(72) Inventor: Bo D. Artin, Diamond Bar, CA (US)

(73) Assignee: Hartwell Corporation, Placentia, CA (US)

( * ) Notice: Subject to any disclaimer, the term of this patent is extended or adjusted under 35 U.S.C. 154(b) by 1299 days.

(21) Appl. No.: 14/845,633

(22) Filed: Sep. 4, 2015

(65) Prior Publication Data

US 2016/0069118 A1  Mar. 10, 2016

Related U.S. Application Data

(60) Provisional application No. 62/046,088, filed on Sep. 4, 2014.

(51) Int. Cl.
*F16B 7/10* (2006.01)
*B64D 29/06* (2006.01)
*E05C 17/30* (2006.01)

(52) U.S. Cl.
CPC .............. *F16B 7/105* (2013.01); *B64D 29/06* (2013.01); *E05C 17/30* (2013.01)

(58) Field of Classification Search
CPC .... E05C 17/30; Y10T 292/28; Y10T 292/285; Y10T 292/286; Y10T 292/2935; Y10T 292/294; Y10T 292/297; Y10T 292/299; Y10T 292/304; Y10T 292/45; Y10T 292/65; Y10T 16/61; Y10T 16/27; Y10T 403/32475; Y10T 403/32501; Y10T 403/32508; Y10T 403/7079; Y10T 403/7081; Y10T 403/7088; F16B 7/00; F16B 7/10; F16B 7/105; F16B 7/14; F16B 7/1409; F16B 15/261; F16B 2015/268; B64D 29/06; B64D 29/08; B64C 1/14; B64C 1/1407; B64C 1/1415; B64C 1/1423; B64C 1/143; B64C 1/1438; B64C 1/1446; B64C 1/1461; B64C 1/1469; B64C 1/1476; B64C 1/1484; B64C 1/1492; B66F 3/24;
(Continued)

(56) References Cited

U.S. PATENT DOCUMENTS

| 597,601 A | 1/1898 | Blaser |
| 1,273,059 A | 7/1918 | Hild |

(Continued)

FOREIGN PATENT DOCUMENTS

| CA | 1129620 | 8/1982 |
| CN | 2159488 | 3/1994 |

(Continued)

OTHER PUBLICATIONS

Merriam-Webster's Dictionary Definition of the word "pin," https://www.merriam-webster.com/dictionary/pin (Year: 2019).*

(Continued)

*Primary Examiner* — Alyson M Merlino
(74) *Attorney, Agent, or Firm* — Barnes & Thornburg LLP

(57) ABSTRACT

A hold open rod assembly includes an outer tubular structure and an inner tubular structure positioned for telescoping movement relative to the outer tubular structure. A locking mechanism retains the hold open rod assembly in an extended state to support a panel of an aircraft in an open position at the selection of a user.

19 Claims, 12 Drawing Sheets

(58) Field of Classification Search
CPC ......... B66F 3/28; F16F 9/0209; F16F 9/0245; F16F 9/0254
USPC .......... 254/93 R, 134; 92/23, 24; 248/345.5, 248/188.5
See application file for complete search history.

(56) References Cited

U.S. PATENT DOCUMENTS

| | | | | |
|---|---|---|---|---|
| 3,107,933 | A | * | 10/1963 | Royster ................. F15B 15/261 403/180 |
| 3,180,234 | A | * | 4/1965 | Crawley ............... F15B 15/261 92/110 |
| 3,469,871 | A | * | 9/1969 | Betts ........................ F16B 7/10 403/325 |
| 3,583,288 | A | * | 6/1971 | Nepp .................... F15B 15/261 92/114 |
| 3,584,544 | A | * | 6/1971 | Haberman ............ F15B 15/261 74/531 |
| 3,945,744 | A | * | 3/1976 | Metz ....................... F16B 7/105 403/317 |
| 4,323,356 | A | | 4/1982 | Stephenson |
| 4,342,135 | A | | 8/1982 | Matsuo et al. |
| 4,503,952 | A | | 3/1985 | Hesse |
| 4,614,004 | A | | 9/1986 | Oshida |
| 4,700,822 | A | | 10/1987 | Maucher et al. |
| 4,946,131 | A | | 8/1990 | Weyand |
| 5,004,215 | A | | 4/1991 | Aubry et al. |
| 5,265,970 | A | | 11/1993 | LaBarre |
| 5,301,775 | A | | 4/1994 | Nedbal et al. |
| 5,323,884 | A | | 6/1994 | Machino |
| 5,366,313 | A | * | 11/1994 | LaBarre ................ F16B 21/165 403/108 |
| 5,407,325 | A | | 4/1995 | Aubry |
| 5,417,511 | A | | 5/1995 | Warden |
| 5,862,896 | A | | 1/1999 | Villbrandt et al. |
| 5,896,959 | A | | 4/1999 | Jeffries et al. |
| 5,950,997 | A | | 9/1999 | Metz |
| 6,193,223 | B1 | | 2/2001 | Jackson |
| 6,334,730 | B1 | | 1/2002 | Porte |
| 6,796,529 | B1 | * | 9/2004 | Duran .................... F16B 7/105 244/118.1 |
| 7,654,371 | B1 | | 2/2010 | Metz et al. |
| 7,882,941 | B2 | | 2/2011 | Rozema |
| 8,147,358 | B2 | | 4/2012 | Chen |
| 2007/0045068 | A1 | | 3/2007 | Namuduri et al. |
| 2009/0324327 | A1 | * | 12/2009 | McAndrews ............... B62J 1/08 403/409.1 |
| 2010/0024161 | A1 | | 2/2010 | Wood et al. |
| 2010/0307872 | A1 | | 12/2010 | Wheeler et al. |
| 2013/0146736 | A1 | | 6/2013 | Wheeler et al. |
| 2013/0175419 | A1 | | 7/2013 | Wheeler et al. |
| 2015/0267724 | A1 | | 9/2015 | Dyer et al. |
| 2015/0284978 | A1 | | 10/2015 | Artin |
| 2016/0069118 | A1 | | 3/2016 | Artin |

FOREIGN PATENT DOCUMENTS

| | | |
|---|---|---|
| CN | 101346576 | 1/2009 |
| FR | 2771459 | 5/1999 |
| WO | WO 2014/071270 | 5/2014 |

OTHER PUBLICATIONS

Search Report & Written Opinion issued in Int'l App. No. PCT/US2018/017007 (dated 2018).

Office Action issued in application No. CN 201380069340.3 (dated Apr. 15, 2016).

Extended Search Report issued in App. No. EP13851198.5 (dated May 23, 2016).

* cited by examiner

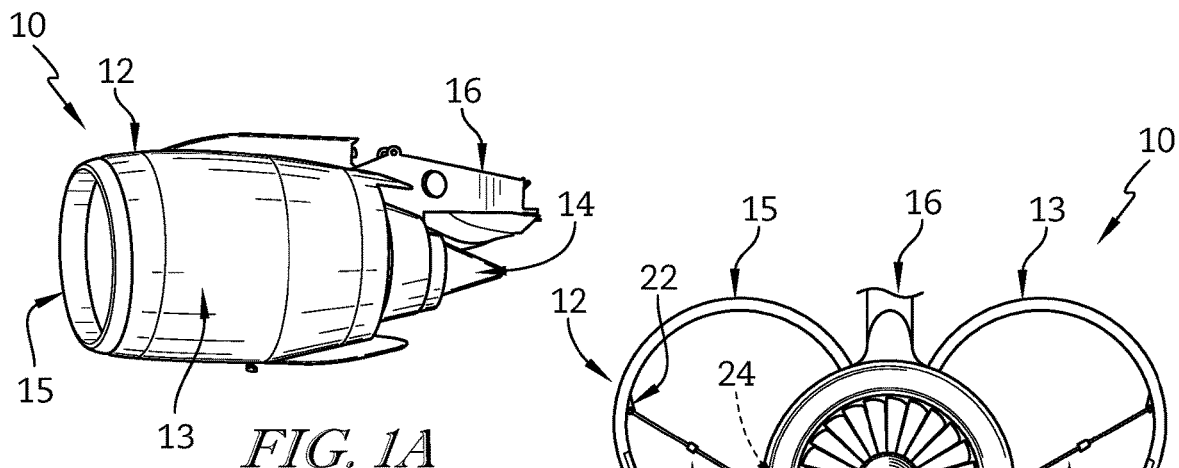
FIG. 1A
FIG. 1B
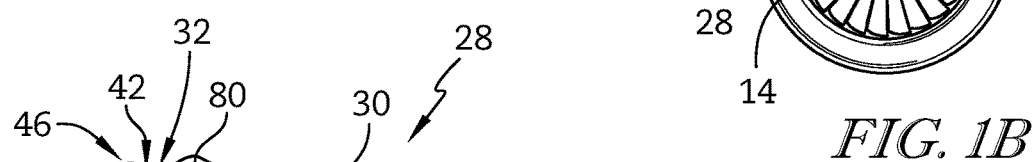
FIG. 2A
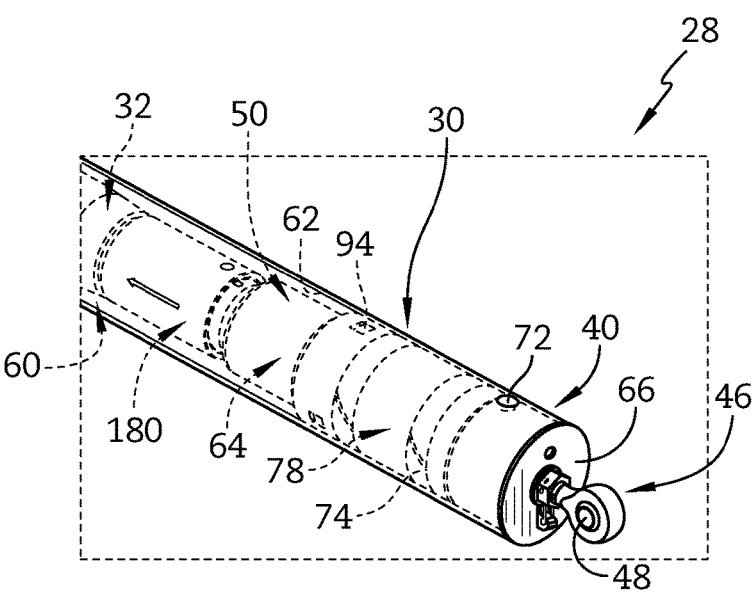
FIG. 2B

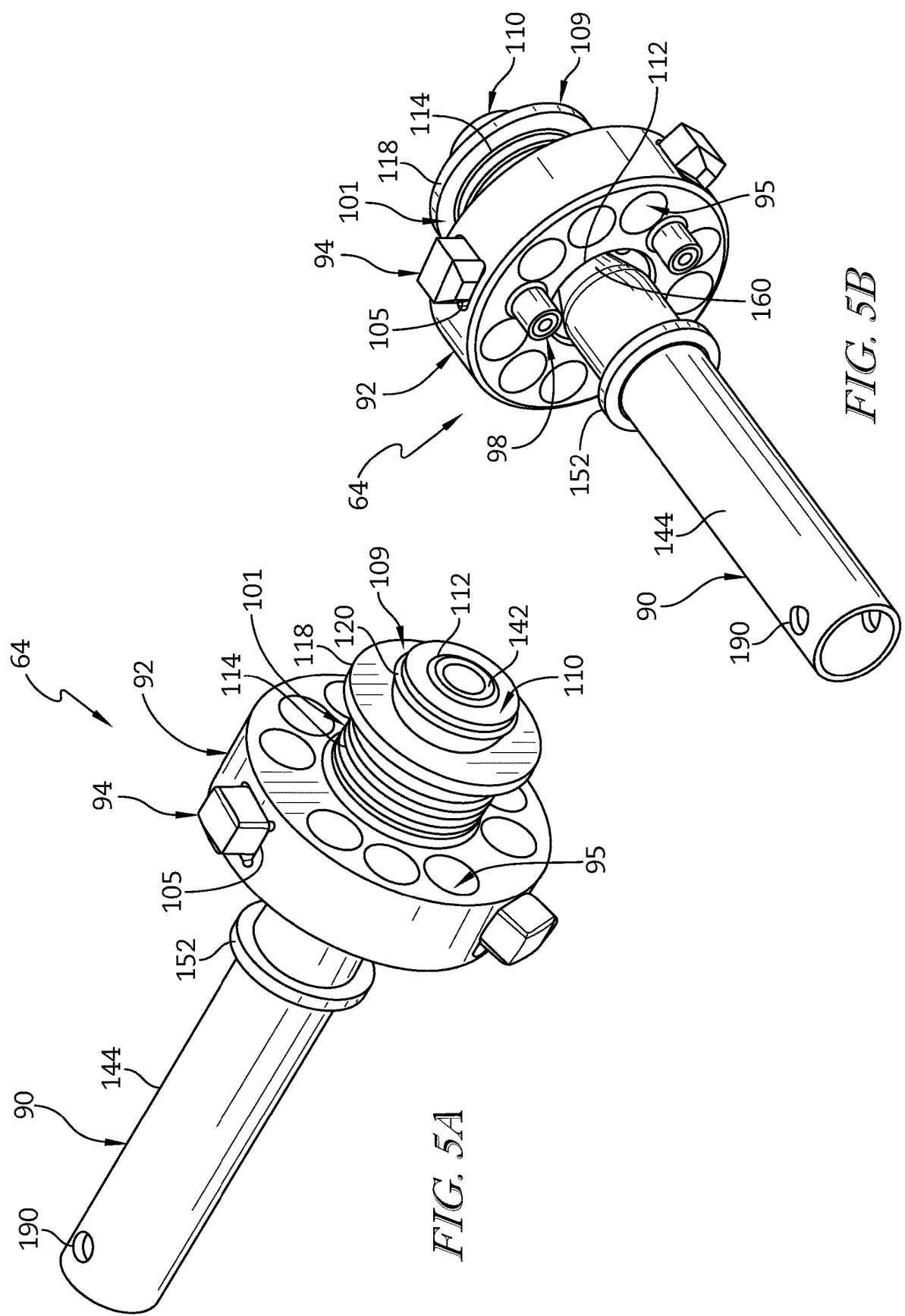

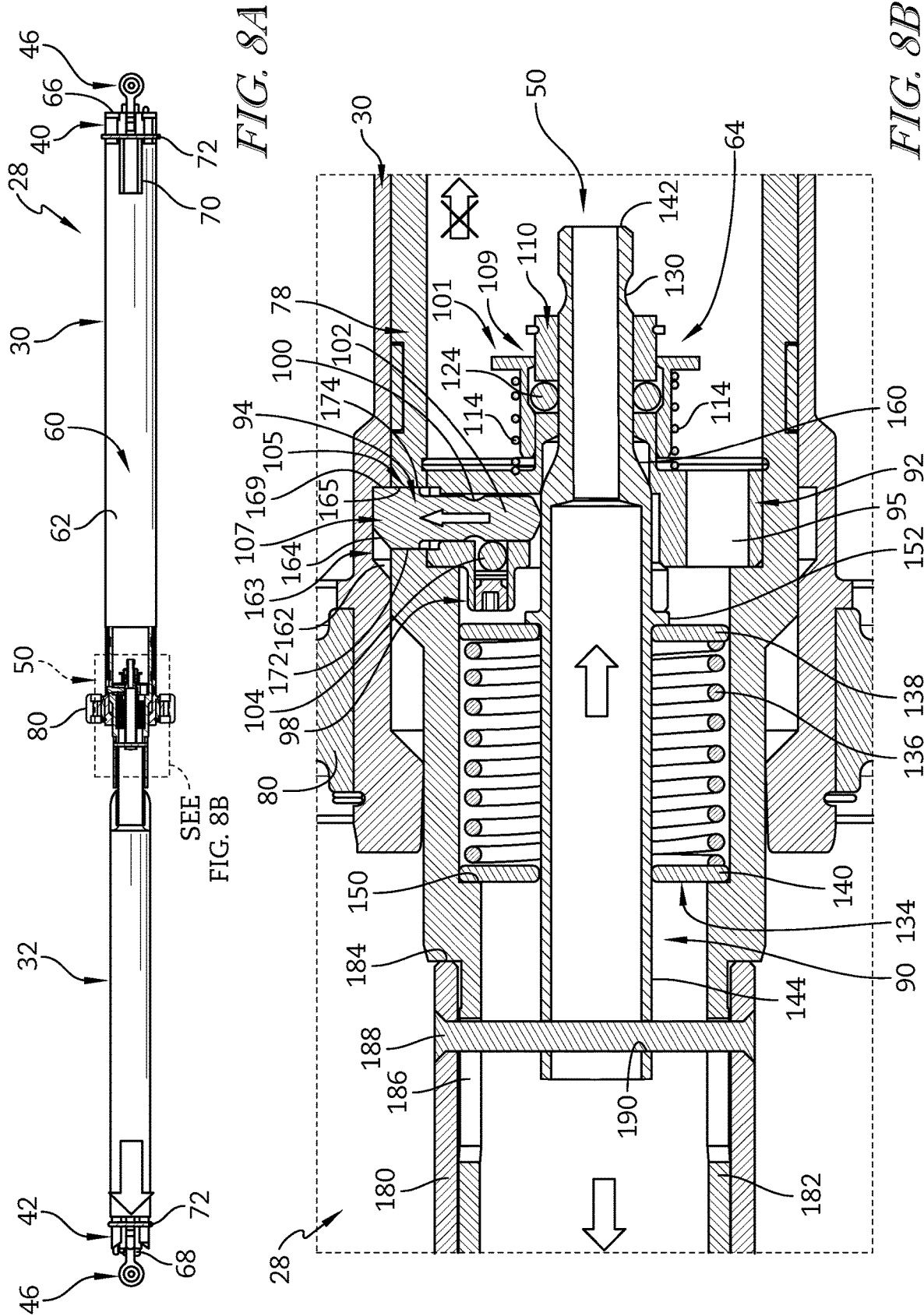

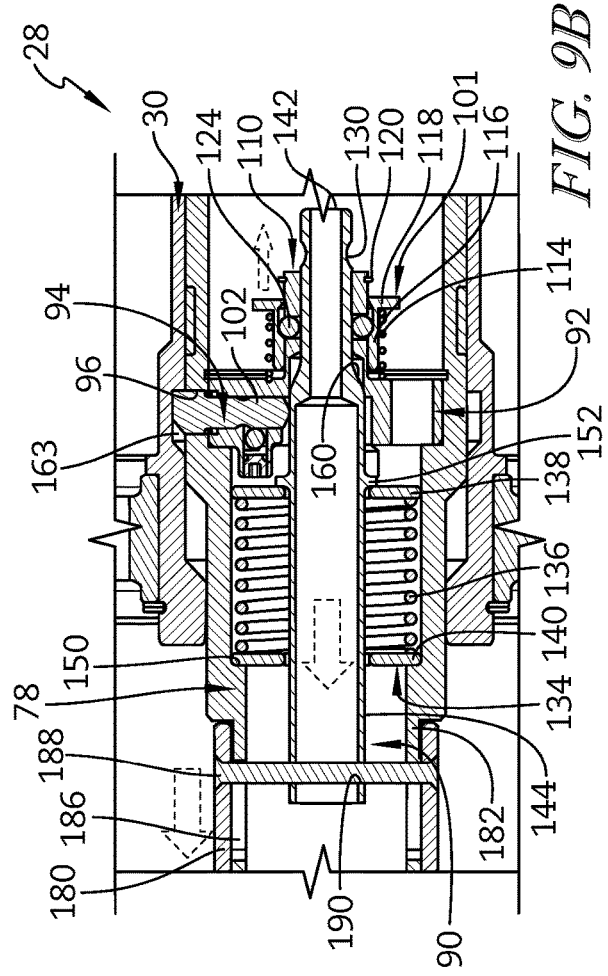
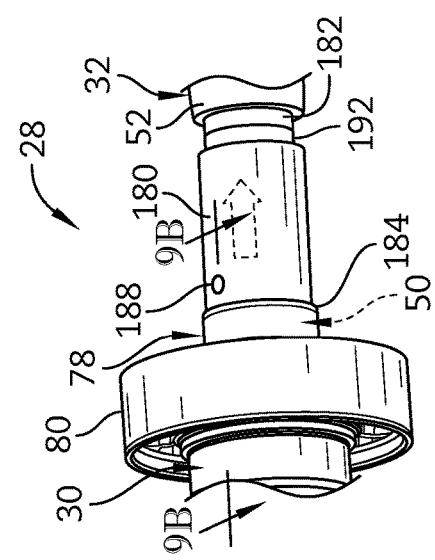
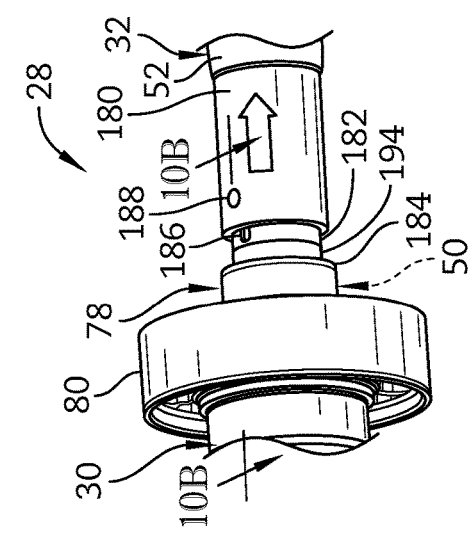

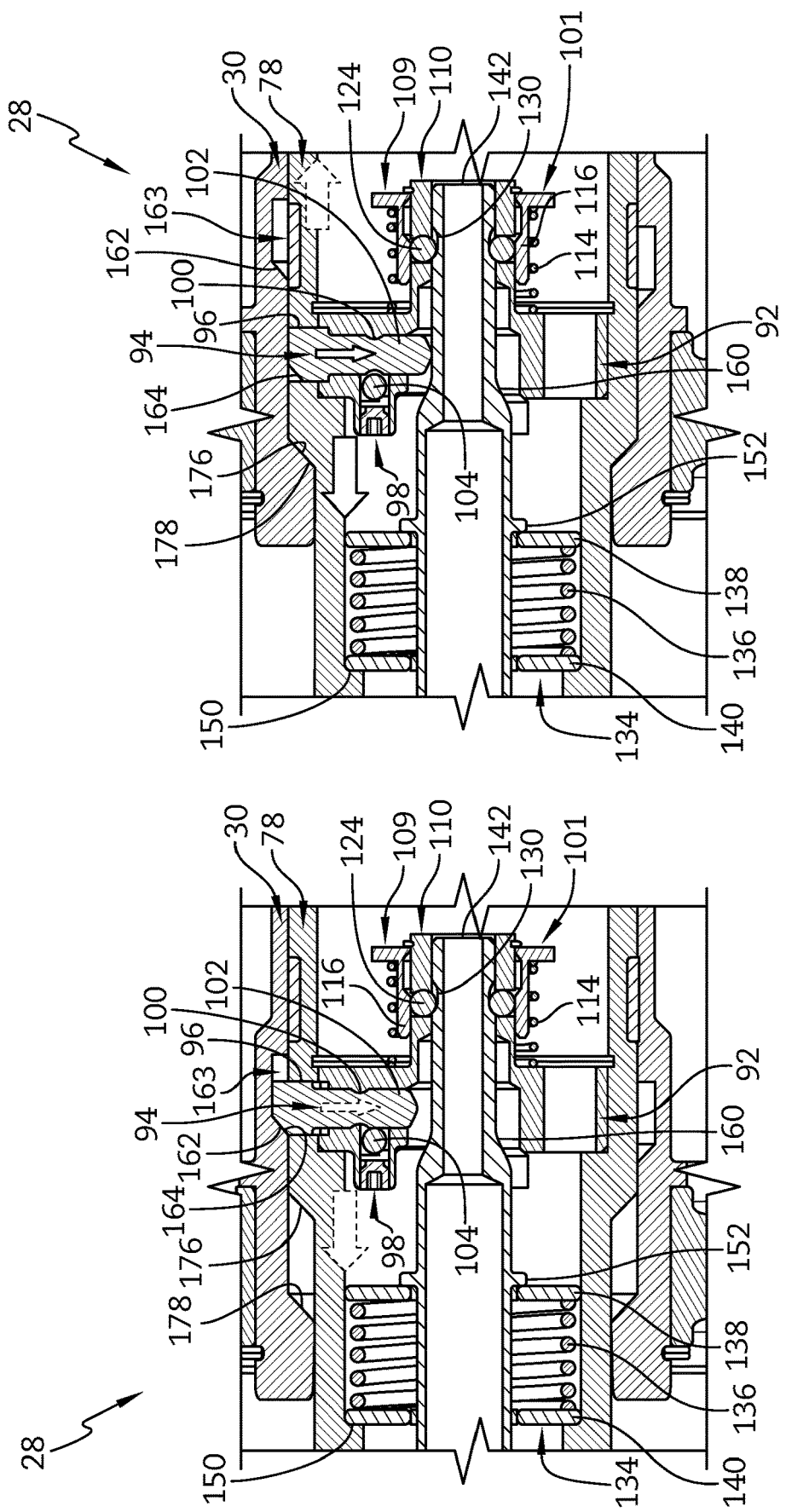

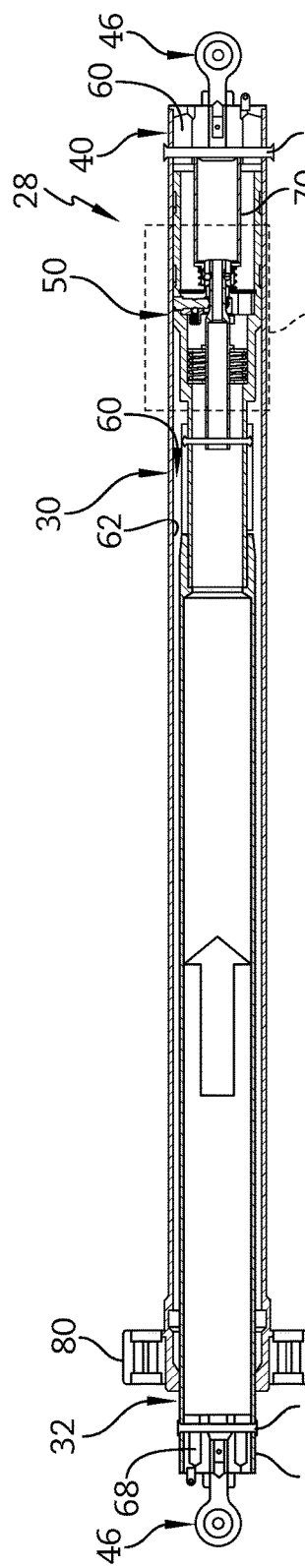
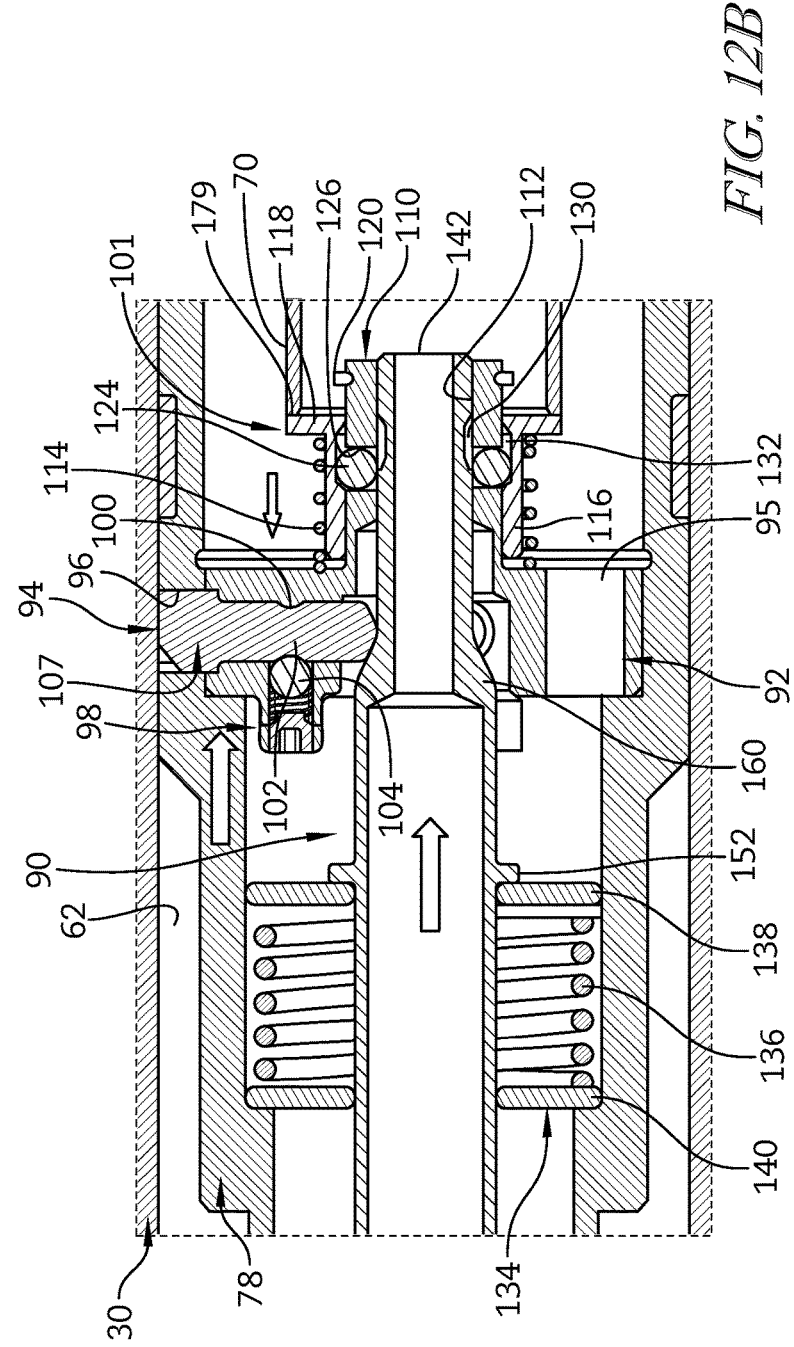

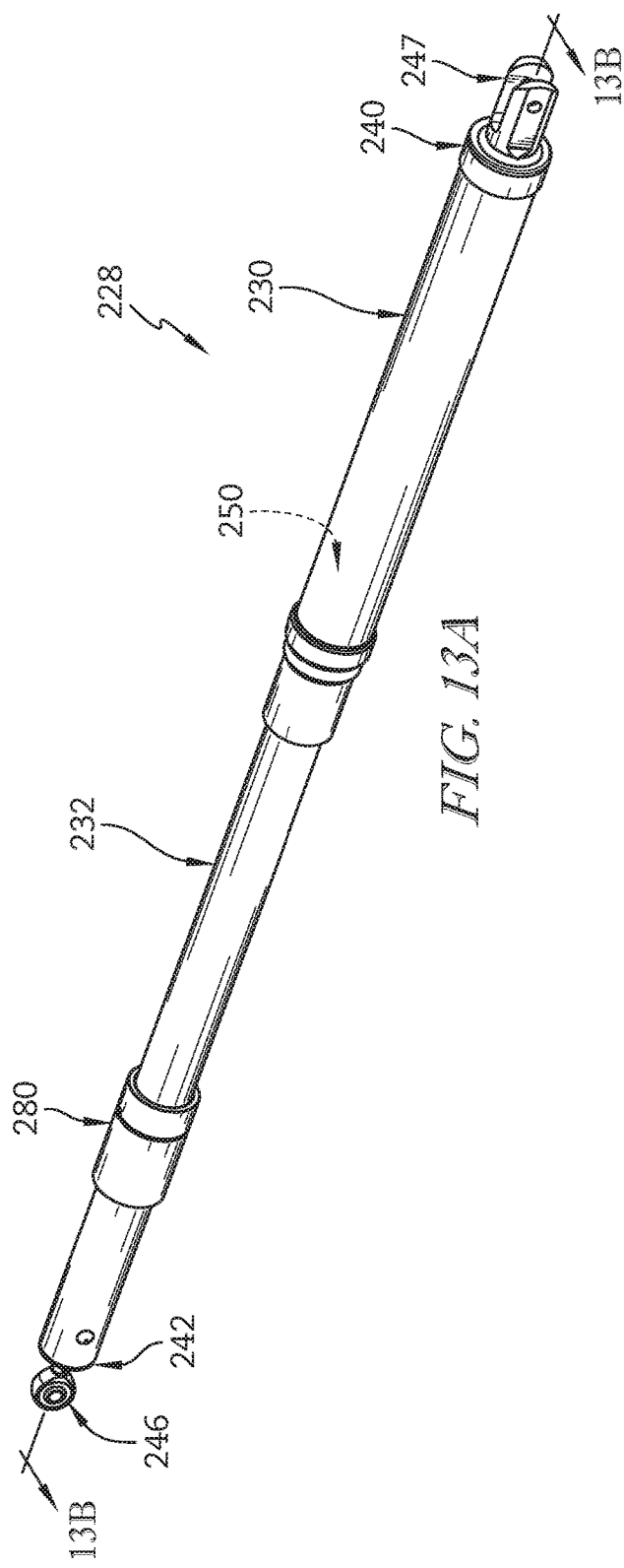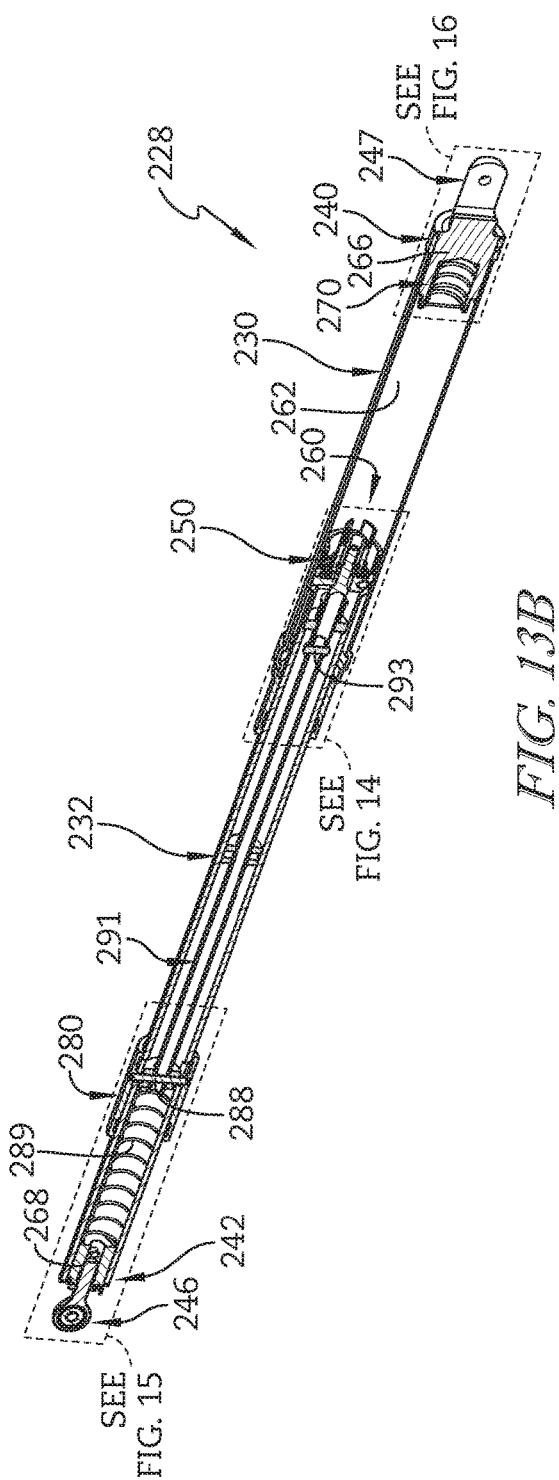
FIG. 13A
FIG. 13B

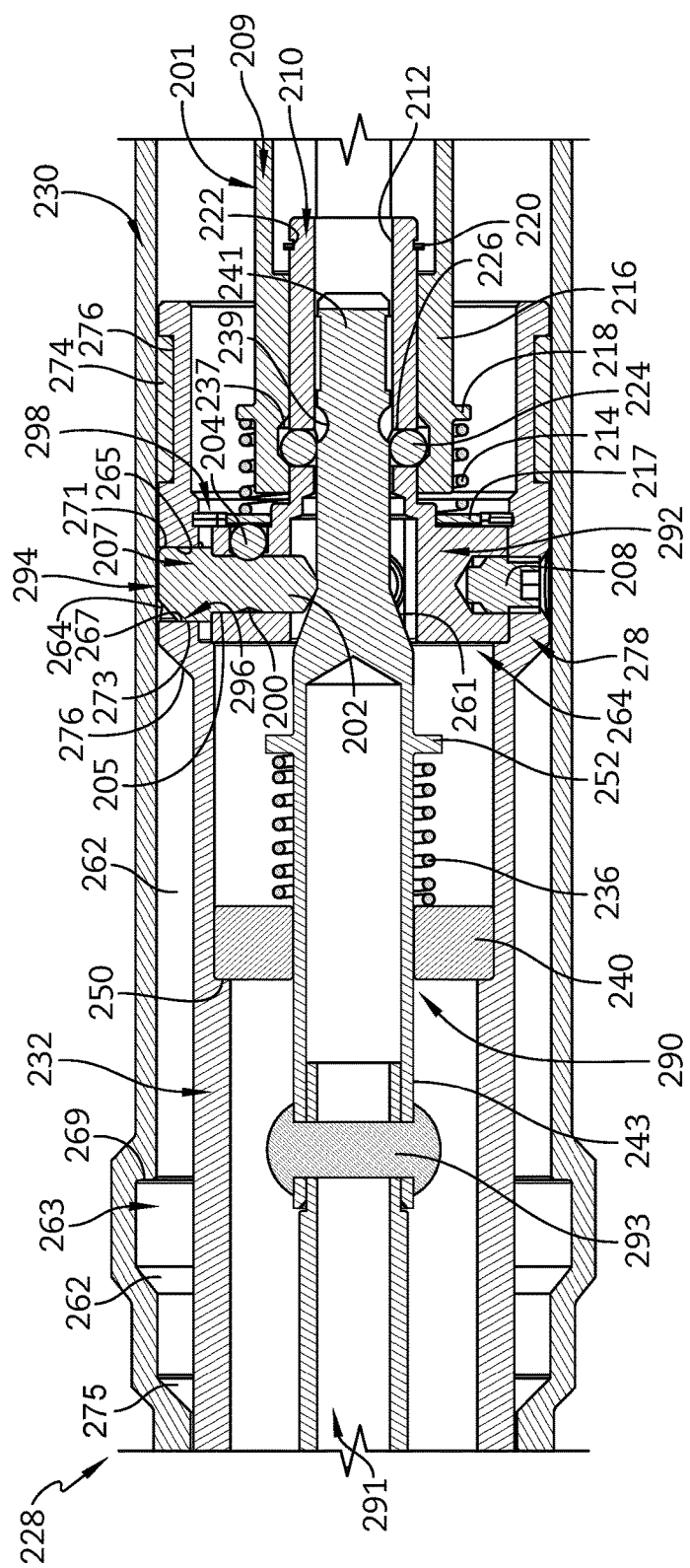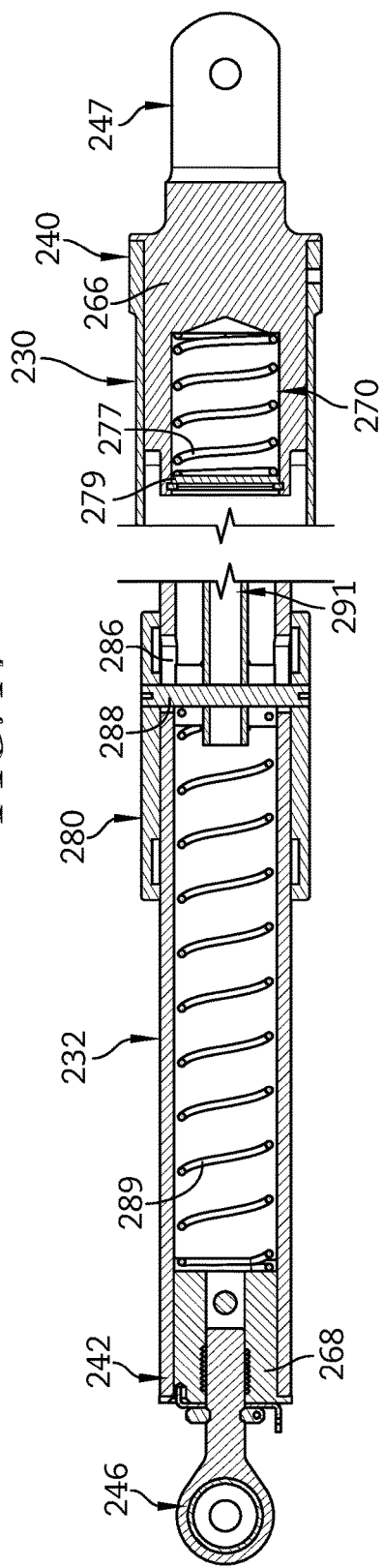
FIG. 14
FIG. 15
FIG. 16

US 10,670,063 B2

HOLD OPEN ROD LOCKING MECHANISM

PRIORITY CLAIM

This application claims priority under 35 U.S.C. § 119(e) to U.S. Provisional Application Ser. No. 62/046,088, filed Sep. 4, 2014, which is expressly incorporated by reference herein.

FIELD OF THE DISCLOSURE

The present disclosure relates generally to a hold open rod for a fan cowl, and more specifically to a locking mechanism for such a hold open rod.

BACKGROUND

Many aircraft include one or more panels which are used to cover an opening of the aircraft. The opening may be covering a door panel, an engine component, or an engine housing often referred to as nacelle or fan cowl. Such structures can be used in a variety of settings in addition to cowls on aircraft.

One of the problems with a cowl is that it may be required to be retained in an open position to allow an aircraft mechanic or other operator to have access to the area underneath the cowl. For example, an aircraft mechanic or other party may need to repair the aircraft of observe the condition of the structures or components underneath the cowl covering. When the cowl is displaced from the remainder of the structure it needs to be retained in an open position. The cowl also needs to be easily closable allowing the operator to disengage any locking mechanisms on the cowl generally easily and efficiently.

One situation that occurs with a cowl is that it may need to accommodate both compressive and tensile loads. A compressive load may occur as a result of the weight of the cowl resting on the extended rod such that the length of the rod carries the weight from a first connecting point at the cowl to a second connecting point on another portion of the aircraft structure. The cowl may need to carry tensile loads when positioned in a different position or when experiencing a wind load. Under these conditions, the rod will need to maintain its locked condition.

This background information is provided to provide some information believed by the applicant to be of possible relevance to the present disclosure. No admission is intended, nor should such admission be inferred or construed, that any of the preceding information constitutes prior art against the present disclosure.

SUMMARY

A hold open rod assembly in accordance with the present disclosure includes a locking mechanism to allow a single operator to control the locking mechanism and to sustain a load while the assembly is unlocked. In illustrative embodiments, the hold open rod assembly is used on a fan cowl of an aircraft. The disclosed hold open rod assembly includes a locking mechanism which is mounted on an internal tube of a telescopic tubular strut structure including the internal tube and an outer tube. The locking mechanism allows the tubular strut structure to be unlocked while sustaining compressive loads such as the retracting load when the system is unlocked. Additionally disclosed is a locking mechanism which resets during extension and/or retraction of the telescopic rod components.

Other aims, objects, advantages and features of the disclosure will become more apparent upon reading of the following non-restrictive description of specific embodiments thereof, given by way of example only with reference to the accompanying drawings.

BRIEF DESCRIPTION OF THE DRAWINGS

The present disclosure will be described hereafter with reference to the attached drawings which are given as a non-limiting example only, in which:

FIG. 1A is a perspective view of an aircraft engine assembly including a nacelle or fan cowl surrounding a gas turbine engine supported on the aircraft by an engine-mounting bracket and suggesting that the fan cowl include a left-side panel and a right-side panel;

FIG. 1B is a front elevation view of the engine assembly of FIG. 1A showing the left-side and right-side panels of the fan cowl extended away from the gas turbine engine in an open position and suggesting that a hold open rod assembly in accordance with the present disclosure is positioned to support the panels in the open position;

FIG. 2A is a perspective view of the hold open rod assembly of FIG. 1B showing that the hold open rod assembly includes an outer tube, an inner tube positioned within the outer tube for telescoping movement, and connection assemblies for connecting with rod mounts of the engine assembly;

FIG. 2B is a detail view of the hold open rod assembly of FIG. 2A for describing that a locking mechanism of the hold open rod assembly is connected to the inner tube and travels within the outer tube as the inner and outer tubes move relative to one another;

FIG. 5A is a front perspective view of the cartridge of FIG. 4B showing that a leading end of the plunger extends through the casing while a trailing end of the plunger extends away from the casing;

FIG. 5B is a rear perspective view of the cartridge of FIG. 5A showing that the lock pins extend into pin holes of the casing to engage with the plunger and are maintained in position by ball detent assemblies;

FIG. 8A is a partial sectional view taken along line 8A-8A in FIG. 3C showing that a portion of the locking mechanism extends out from the outer tube when the hold open rod assembly is in the fully extended position;

FIG. 8B is an enlarged illustration of FIG. 8A showing the pin heads of the lock pins positioned in a groove formed on the inside surface of the outer tube and suggesting that the ramp of the plunger forced the lock pins radially outward into the groove of the outer tube to place the hold open rod assembly in the locked state;

FIG. 9A is a partial perspective view of the hold open rod assembly of FIG. 3C showing an indicia of locked status exposed by a lock-release sleeve and suggesting that the lock release sleeve is about to move to cover the indicia of locked status and place the hold open rod assembly in an intermediate unlocked state;

FIG. 9B is a sectional view taken along line 9B-9B in FIG. 9A showing that the lock-release sleeve is coupled to the plunger by a pin to move the plunger when the sleeve is moved;

FIG. 10A is a view similar to FIG. 9A showing that the lock-release sleeve has moved to uncover an indicia of unlocked status;

FIG. 10B is a sectional view taken along line 10B-10B in FIG. 10A showing that the plunger of the locking mechanism has moved with the lock-release sleeve and suggesting that a plunger-motion controller has been activated to restrict movement of the plunger;

FIG. 11A is a partial sectional view of the locking mechanism of FIG. 10B showing the hold open rod assembly in an intermediate unlocked state and suggesting that extension of the hold open rod assembly will retract the lock pins from the groove of the outer tube;

FIG. 11B is a view similar to FIG. 11A showing that the lock pins are in a retracted position and suggesting that the lock pins engaged with a beveled surface of the groove to move the lock pins radially inward;

FIG. 12A is a partial sectional view taken along line 12A-12A in FIG. 3A showing that the outer tube includes an end plug coupled to a first end of the outer tube and suggesting that the locking mechanism is moving toward the first end of the outer tube to engage with the end plug;

FIG. 12B is a detail view of FIG. 12A showing the bushing of the cartridge engaged with a plug extension of the end plug and suggesting that an interior groove of the bushing is aligned with the ball bearings in the shaft of the casing to allow the ball bearings to extend out from the groove of the plunger and release the plunger to move toward the lock pins;

FIG. 13A is a perspective view of another embodiment of a hold open rod assembly in accordance with the present disclosure;

FIG. 13B is a sectional view taken along line 13B-13B in FIG. 13A;

FIG. 14 is an enlarged illustration of FIG. 13B;

FIG. 15 is an enlarged illustration of FIG. 13B; and

FIG. 16 is an enlarged illustration of FIG. 13B.

Figure 3A:
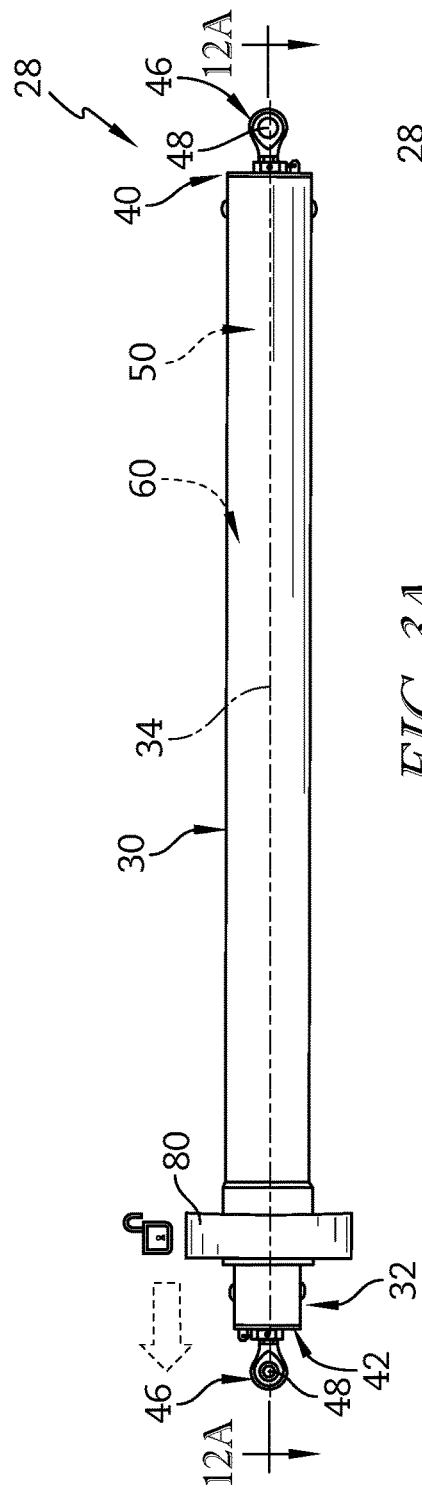
FIG. 3A is a side elevation view of the hold open rod assembly of FIG. 2A showing the hold open rod assembly in a fully collapsed position corresponding to a closed position of the panels of the fan cowl and suggesting that the hold open rod assembly is in an unlocked state.

The exemplification set out herein illustrates embodiments of the disclosure that are not to be construed as limiting the scope of the disclosure in any manner. Additional features of the present disclosure will become apparent to those skilled in the art upon consideration of the following detailed description of illustrative embodiments exemplifying the best mode of carrying out the disclosure as presently perceived.

DETAILED DESCRIPTION

While the present disclosure may be susceptible to embodiment in different forms, there is shown in the drawings, and herein will be described in detail, embodiments with the understanding that the present description is to be considered an exemplification of the principles of the disclosure. The disclosure is not limited in its application to the details of structure, function, construction, or the arrangement of components set forth in the following description or illustrated in the drawings. The disclosure is capable of other embodiments and of being practiced or of being carried out in various ways. Also, it is to be understood that the phraseology and terminology used herein is for the purpose of description and should not be regarded as limiting. The use of various phrases and terms is meant to encompass the items or functions identified and equivalents thereof as well as additional items or functions. Unless limited otherwise, various phrases, terms, and variations thereof herein are used broadly and encompass all variations of such phrases and terms. Furthermore, and as described in subsequent paragraphs, the specific configurations illustrated in the drawings are intended to exemplify embodiments of the disclosure. However, other alternative structures, functions, and configurations are possible which are considered to be within the teachings of the present disclosure. Furthermore, unless otherwise indicated, the term "or" is to be considered inclusive. The terms of this description should be broadly interpreted throughout this application to include all known as well as all hereafter discovered versions, equivalents, variations and other forms of the abovementioned terms as well as other terms. The present disclosure is intended to be broadly interpreted and not limited.

An engine assembly 10 for attachment with an aircraft is shown in FIG. 1A. Engine assembly 10 includes a nacelle or fan cowl 12 positioned to surround a gas turbine engine 14 supported by an engine-mounting bracket 16 for securing engine assembly 10 to the aircraft. Fan cowl 12 includes a right-side panel 13 and a left-side panel 15 which are movable relative to engine 14 between a closed position, shown in FIG. 1A, and an open position, shown in FIG. 1B.

One or more hold open rod assemblies 28 in accordance with the present disclosure are positioned to support right-side and left-side panels 13, 15 in the open position as suggested in FIG. 1B. Each hold open rod assembly 28 is coupled between an outer rod mount 22 of panels 13, 15 and an inner rod mount 24. Inner rod mount 24 is illustratively coupled to another portion of fan cowl 12, but may be part of engine 14 in some embodiments. Connection assemblies 46 having pivotable bushings 48 are attached to an end 40 of outer tube 30 and an end 42 of inner tube 32 for attachment of hold open rod assembly 28 with outer and inner rod mounts 22, 24 as suggested in FIGS. 2A and 2B.

Each hold open rod assembly 28 includes an outer tube 30, an inner tube 32, and a locking mechanism 50 as shown in FIG. 2A. Inner tube 32 extends into outer tube 30 and is configured to move relative to outer tube 30 telescopically. In the illustrative embodiment, locking mechanism 50 is coupled to inner tube 32 to move within outer tube 30 as inner tube 32 moves relative to outer tube 30. A snubber 80 is coupled to an exterior of hold open rod assembly 28 to laterally bias hold open rod assembly 28 away from engine 14 while panels 13, 15 are in the closed position. As such, snubber 80 assists in initially opening panels 13, 15 when they are released from the closed position. In some embodiments, snubber 80 is formed from a flexible materials, such as rubber for example. In some embodiments, snubber 80 engages with engine 14 or another portion of fan cowl 12 to place a lateral biasing force against hold open rod assembly 28.

Locking mechanism 50 includes an inner body 78 and a cartridge 64 as suggested in FIG. 2B. Inner body 78 slides within a cavity 60 of outer tube 30 along an inner surface 62 thereof. Inner body 78 is coupled to inner tube 32 and houses cartridge 64 for movement with inner tube 32 as suggested in FIGS. 4A and 4B. Lock pins 94 of cartridge 64 slide along inner surface 62 and engage with outer tube 30 to block movement of inner tube 32 relative to outer tube 30 when panels 13, 15 are in the open position as suggested in FIGS. 7A-8B. A lock-release sleeve 180 is coupled with cartridge 64 and configured to unlock hold open rod assembly 28 at the selection of a user to allow movement of panels 13, 15 from the open position to the closed position as suggested in FIGS. 9A-12B.

Figure 3B:
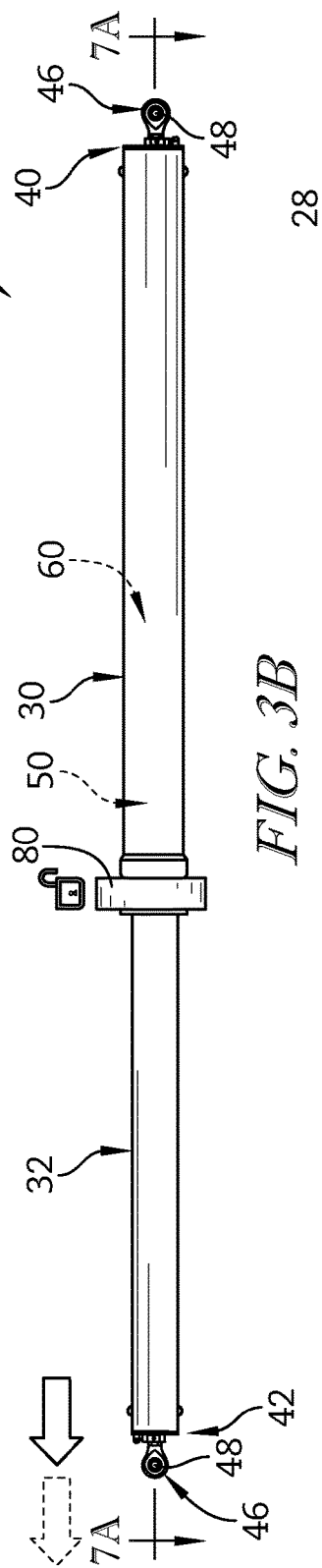
FIG. 3B is a view similar to FIG. 3A showing the hold open rod assembly partially extended to a vibrational position and suggesting that the hold open rod assembly is still in the unlocked state to allow the hold open rod assembly extend or retract at the selection of a user.
Figure 3C:
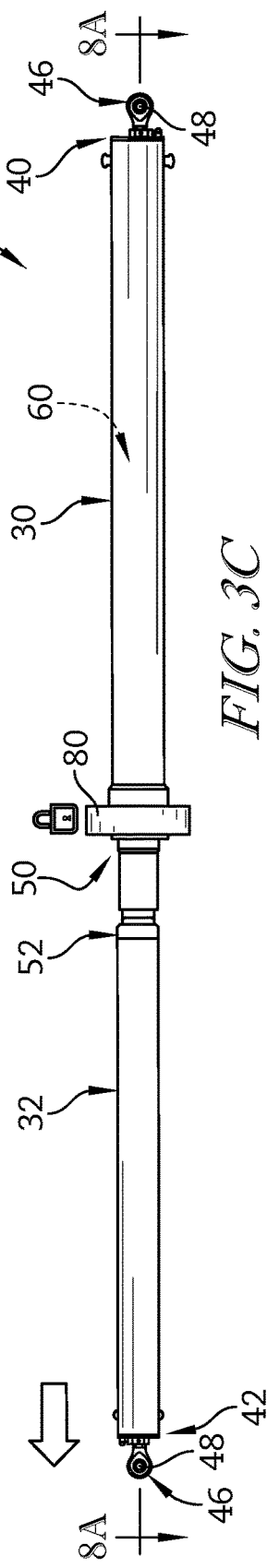
FIG. 3C is a view similar to FIG. 3A showing the hold open rod assembly in a fully extended position corresponding to the open position of the panels of the fan cowl and suggesting that the hold open rod assembly is in a locked state to retain the panels in the open position.

Inner tube 32 is received in outer tube 30 and in an unlocked state when hold open rod assembly 28 is in a fully collapsed position as suggested in FIG. 3A. Inner tube 32 extends away from outer tube 30 as panels 13, 15 are opened as suggested in FIG. 3B. In the illustrative embodiment, hold open rod assembly 28 is in an unlocked state while inner tube 32 is moving relative outer tube 30 from the fully collapsed position. This intermediate position is sometimes referred to as a vibration position, and a user may move panels 13, 15 toward the open or closed position while hold open rod assembly 28 is in the vibration position. Hold open rod assembly 28 is placed in a locked state when panels 13, 15 reach the open position and hold open rod assembly 28 is in a fully extended position as suggested in FIG. 3C.

Figures 4A, 4B:
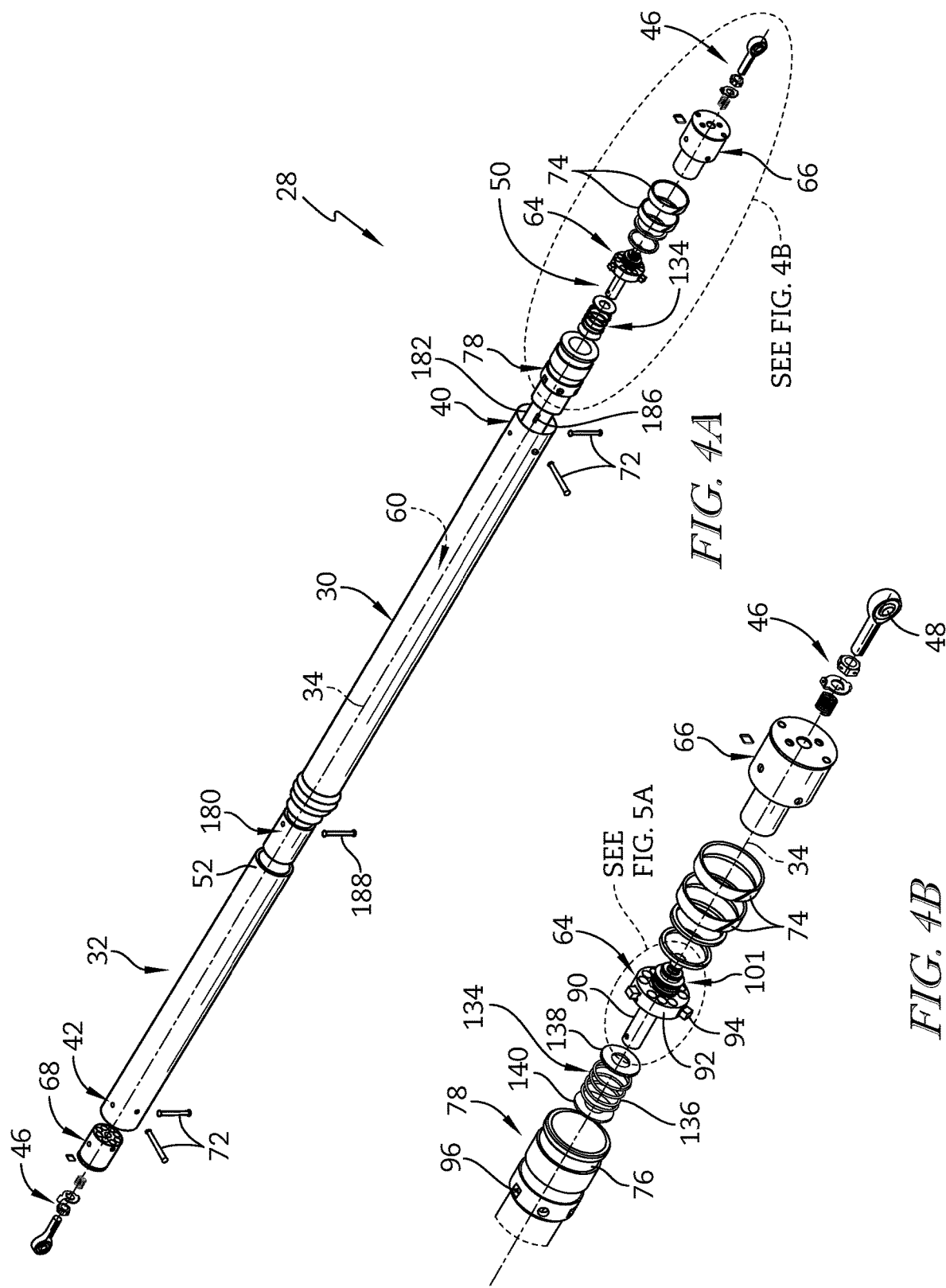
FIG. 4A is an exploded perspective view of the hold open rod assembly of FIG. 2A showing that locking mechanism includes an inner body and a cartridge coupled to the inner body for movement within the outer tube.
FIG. 4B is an exploded perspective view of the locking mechanism of FIG. 4A showing that the cartridge includes a casing, lock pins positioned around the casing, and a plunger to actuate the lock pins and suggesting that the cartridge is received in the inner body such that the lock pins extend through openings of the inner body.

Hold open rod assembly 28 is assembled along a central axis 34 thereof as suggested in FIG. 4A. Inner tube 32 and locking assembly 50 are arranged within outer tube 30, and end plugs 66, 68 are coupled to ends 40, 42, respectively, and held in place by pins 72 to define an internal cavity 60 of hold open rod assembly 28. In the illustrative embodiment, cartridge 64 is received in internal body 78 which is inserted in to outer tube 30 to engage with inner tube 32. Internal body 78 includes an extending portion 182 and a slot formed through extending portion 182. In some embodiments, extending portion 182 threadedly engages with inner tube 32.

Cartridge 64 includes a casing 92, lock pins 94 which extend into casing 92, and a plunger 90 which extends into casing 92 to engage with lock pins 94 as suggested in FIG. 4B. Cartridge 64 is received in internal body 78 such that lock pins 92 extend into openings 96 of internal body 78. A plunger biaser 134 is coupled between cartridge 64 and internal body 78 to bias plunger 90 toward lock pins 94.

Plunger biaser 134 includes a pair of washers 138, 140 and a compression spring 136 positioned between washers 138, 140 to bias washers 138, 140 away from one another. A pair of expanding rings 74 are configured to engage with annular grooves 76 formed in internal body 78.

Extending portion 182 of internal body 78 also passes through lock-release sleeve 180 as suggested in FIG. 4A. A pin 188 extends through lock-release sleeve 180 and into slot 186 to engage with plunger 90 of cartridge 64 to allow a user to unlock hold open rod assembly 28. Casing 92 of cartridge 64 is formed to include a plurality of fluid pass-throughs 95 as shown in FIGS. 5A and 5B. In some embodiments, expanding rings 74 seal against outer tube 30 and cooperate with fluid pass-throughs 95 to provide dampening forces during movement of left-side and right-side panels 13, 15 of fan cowl 12. For example, cavity 60 can be filled with a fluid, such as air or a liquid, and fluid pass-throughs 95 act as a restriction to movement of the fluid within cavity 60 to regulate movement of inner tube 32 relative to outer tube 30. Expanding rings 74 slide along outer tube 30 as inner tube 32 moves relative to outer tube 30.

Figure 6:
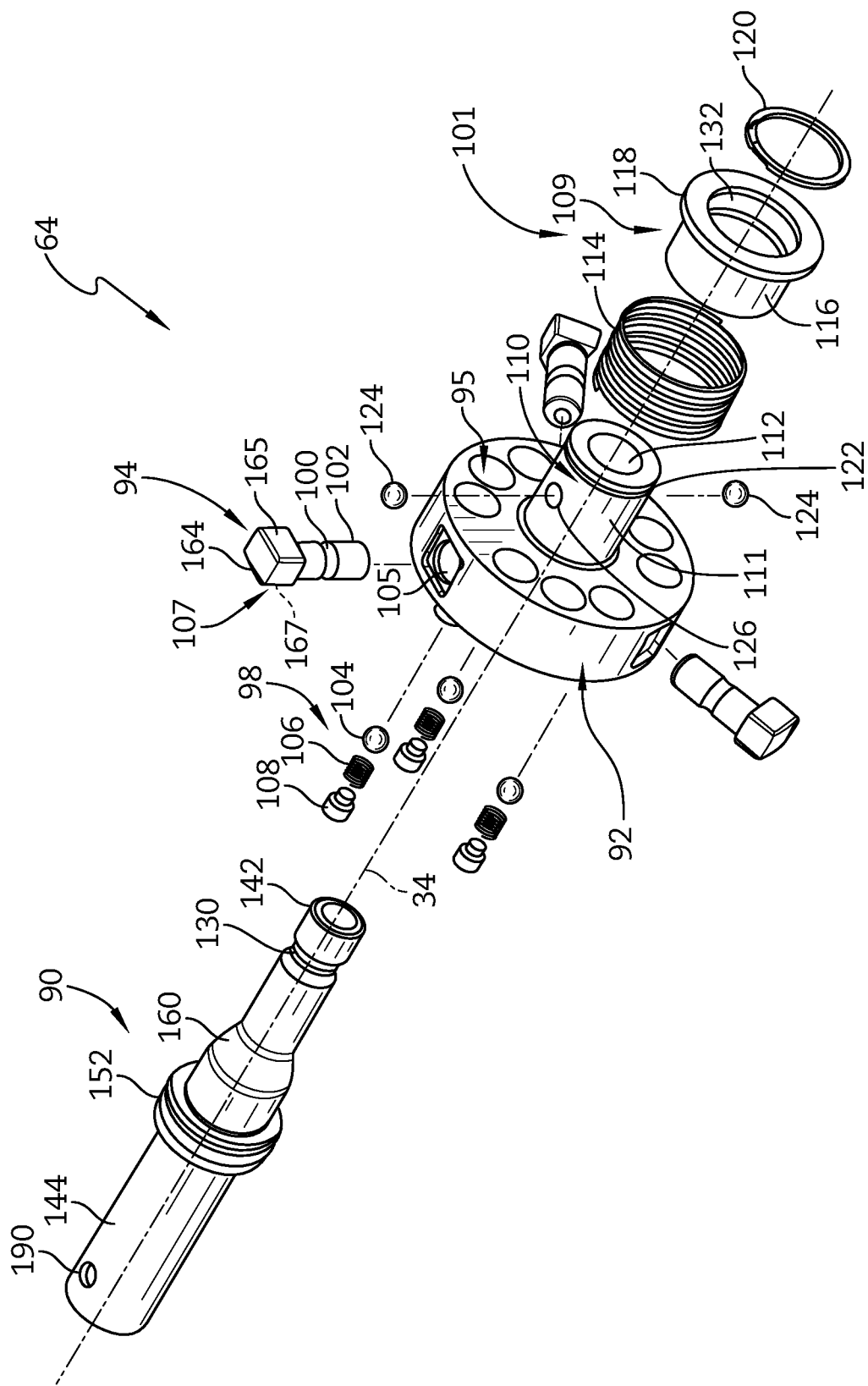
FIG. 6 is an exploded perspective view of the cartridge of FIG. 5B showing that the leading end of the plunger is formed to include a groove and suggesting that ball bearings extend into the casing to engage with the leading end of the plunger to control movement of the plunger relative to the casing.

Plunger 90 includes a leading end 142 and a trailing end 144 as suggested in FIGS. 5A-6. A radially extending flange 152 is formed on plunger 90 between leading end 142 and trailing end 144 and is configured to cooperate with plunger biaser 134 to bias plunger 90 toward lock pins 94. Plunger 90 is formed to include a ramp 160 to engage with lock pins 94 and force lock pins 94 radially outward as plunger 90 is biased toward lock pins 94. Plunger 90 is also formed to include an annular groove 130 to engage with ball bearings 124 of a plunger-motion controller 101 to control movement of plunger 90 relative to casing 92. A hole 190 is formed through trailing end 144 of plunger 90 for receiving pin 188 which is also engaged with lock-release sleeve 180.

Lock pins 94 include a pin head 107 and pin shaft 102 as shown in FIG. 6. Pin head 107 includes a leading surface 165 and a trailing surface 167 opposite of leading surface 165. A beveled edge 164 is formed along a radially outer edge of trailing surface 167. Pin shaft 102 is formed to include an annular groove 100 for engaging with a ball detent assembly 98. Ball detent assemblies 98 each include a ball bearing 104, a compression spring 106, and a set screw 108 to couple ball detent assembly 98 with casing 92. Pin shafts 102 of lock pins 94 are inserted into pin holes 105 formed in casing 92 and plunger 90 is inserted into casing 90 as suggested in FIGS. 5A and 5B. Three lock pins 94 are shown. In some embodiments, more than three lock pins 94 are used. In some embodiments, less than three lock pins 94 are used.

Casing 92 also includes a stem 110 extending from one side of casing 92 which defines an internal bore 112 for receiving leading end 142 of plunger 90 as suggested in FIGS. 5A-6. Plunger-motion controller 101 engages with stem 110 and includes ball bearings 124, a bushing 109, and a compression spring 114. Holes 126 are formed through stem 110 for receiving ball bearings 124. Bushing 109 slides over an exterior surface 111 of stem 110 to trap ball bearings 124 between bushing 109 and plunger 90 as suggested in FIG. 6. Bushing 109 includes a sleeve 116 and a flange 118. Compression spring 114 is positioned to surround sleeve 116 and is configured to engage with casing 92 and flange 118 to bias bushing 109 away from casing 92. A retaining ring 120 is coupled to an annular groove 122 formed in stem 110 to retain bushing 109 on stem 110. Bushing 109 is also formed to include an internal annular groove 132 for receiving ball bearings 124.

Figure 7A:
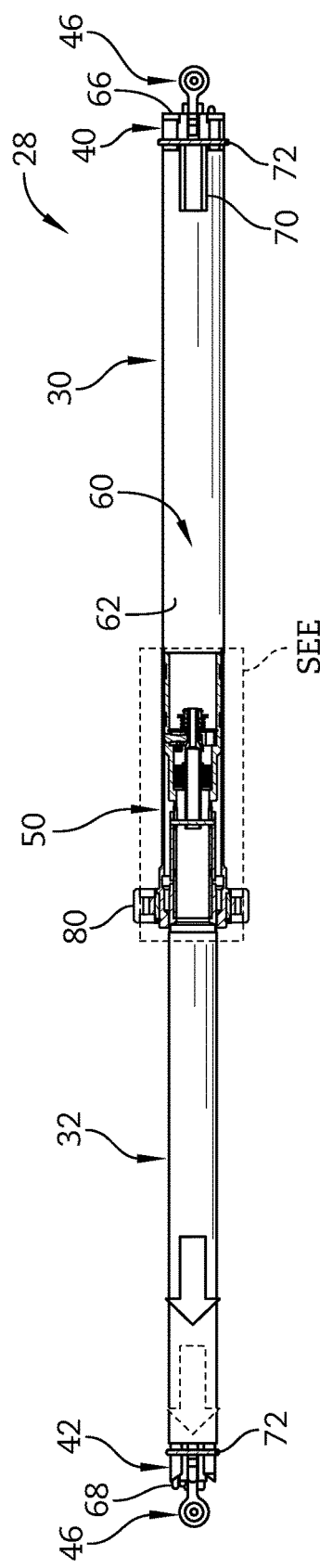
FIG. 7A is a partial sectional view taken along line 7A-7A in FIG. 3B showing that the locking mechanism is positioned within a cavity defined in part by the outer tube.
Figure 7B:
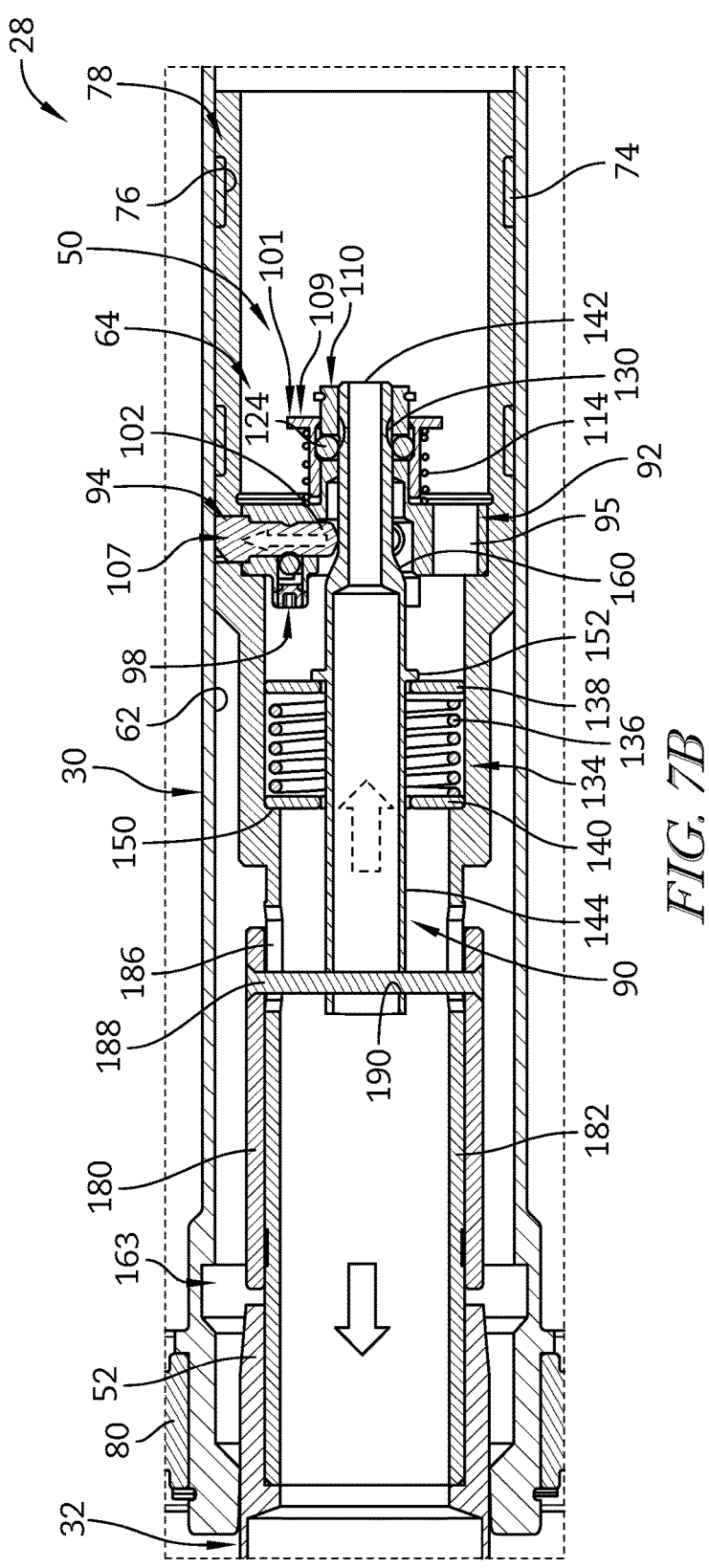
FIG. 7B is an enlarged illustration of FIG. 7A showing that a pin head of the lock pins engages with an inner surface of the outer tube when the hold open rod assembly is in the vibration position and suggesting that the plunger is biased toward the lock pins such that a ramp engages the lock pins to force the lock pins against the inner surface of the outer tube.

In operation, inner tube 32 is extended away from outer tube 30 as panels 13, 15 are being opened as suggested in FIG. 7A. Locking mechanism 50 moves with inner tube 32. Plunger biaser 134 is positioned between an internal shoulder 150 of internal body 78 and flange 152 of plunger 90 to bias plunger 90 toward lock pins 94. Ramp 160 of plunger 90 engages with pin shafts 102 of lock pins 94 to bias lock pins 94 radially outward. Pin heads 107 slide along internal surface 62 of outer tube 30 as inner tube 32 moves relative to outer tube 30.

Hold open rod assembly 28 reaches a fully extended position when panels 13, 15 reach the open position as suggested in FIG. 8A. In the fully extended position, lock pins 94 align with an internal annular groove 163 of outer tube 30 and are forced into groove 163 by plunger 90 as suggested in FIG. 8B. Leading surface 165 of pin head 107 engages with a surface 169 of groove 163 to block inner tube 32 from extending back into outer tube 30 and places hold open rod assembly 28 in a locked state to support panels 13, 15 in the open position. A corresponding surface 172 of opening 96 engages with pin head 107 to counteract compressive forces on hold open rod assembly 28. Lock-release sleeve 180 moves with plunger 90 through connection of pin 188 which moves in slot 186. Lock-release sleeve 180 limits movement of plunger 90 by engaging a stop shoulder 184 formed on inner body 78.

Plunger 90 is positioned to block radially inward movement of lock pin 94 as shown in FIG. 8B. Further extension of hold open rod assembly 28, such as through unintentional movement of panels 13, 15, engages beveled edge 164 of pin head 107 with a beveled surface 162 of groove 163 to block movement of inner tube 32 relative to outer tube 30 while hold open rod assembly 28 is in the locked state. For example, a gust of wind may bias panels 13, 15 toward a position beyond the open position, but panels 13, 15 remain in the open position due to the locking mechanism 50. A corresponding surface 174 of opening 96 engages with pin head 107 to counteract extension forces on hold open rod assembly 28.

Movement of lock-release sleeve 180 by a user moves plunger 90 relative to lock pins 94 to place hold open rod assembly 28 in an intermediate unlocked state as suggested in FIGS. 9A-10B. In the illustrative embodiment, an indicia of locked status 192 of hold open rod assembly 28 is coupled to extending portion 182 to indicate to a user that hold open rod assembly is in the locked state as suggested in FIG. 9A. In some embodiments, indicia of locked status 192 is a green band or stripe. A user moves lock-release sleeve 180 toward end 52 of inner tube 32 to move plunger 90 as suggested in FIGS. 10A and 10B.

In the intermediate unlocked state, lock pins 94 are still engaged with groove 163 to block movement of inner tube 32 relative to outer tube 30 toward the collapsed position as suggested in FIG. 10B. As such, hold open rod assembly 28 supports panels 13, 15 in the open position while in the intermediate unlocked state to allow a user to prepare the panels 13, 15 for movement to the closed position without the user having to hold panels 13, 15 in the open position themselves. In the illustrative embodiment, an indicia of unlocked status 194 of hold open rod assembly 28 is coupled to extending portion 182 to indicate to a user that hold open rod assembly is in an unlocked state as suggested in FIG. 10A. In some embodiments, indicia of locked status 194 is a red band or stripe to indicate to a user that movement may place hold open rod assembly 28 in a fully unlocked state and allow panels 13, 15 to move toward the closed position.

As lock-release sleeve 180 is pulled to move plunger 90, groove 130 formed near leading end 142 aligns with holes 126 as suggested in FIG. 10B. Compression spring 114 biases bushing 109 away from casing 92 to force ball bearing 124 out of groove 132 of bushing 109 and into groove 130 of plunger 90. Sleeve 116 then traps ball bearing 124 in groove 130 such that ball bearing 124 engages with plunger 90 to block movement of plunger 90. This again allows a user to place hold open rod assembly 28 in the intermediate unlocked state without needing to further interact with hold open rod assembly 28 during closing of panels 13, 15.

Inner tube 32 is extended away from outer tube 30, such as by moving panels 13, 15 past the open position, to engage beveled edge 164 of pin heads 107 with beveled surface 162 of groove 163 as suggested in FIG. 11A. Inner tube 32 is moved until an outer shoulder 176 of inner body 78 engages with an inner shoulder 178 of outer tube 30 such that lock pins 94 are forced radially inward toward plunger 90 to place hold open rod assembly 28 in a fully unlocked state as suggested in FIG. 11B. Groove 100 on pin shaft 102 aligns with ball bearing 104 of ball detent assembly 98 to maintain lock pin 94 in position relative to plunger 90 while hold open rod assembly 28 is in the fully unlocked state so that lock pins 94 do not re-engage groove 163.

Inner tube 32 extends into outer tube 30 as panels 13, 15 are moved to the closed position as suggested in FIG. 12A. Locking mechanism 50 engages with a cylindrical plug extension 70 of end plug 66 when hold open rod assembly 28 is in the fully collapsed position as suggested in FIGS. 12A and 12B. An end 179 of plug extension 70 engages with flange 118 of bushing 109 to align internal groove 132 with holes 126. Plunger biaser 134 biases plunger 90 toward casing 92 to force ball bearing 124 out of groove 130 near leading end 142 and into groove 132 of bushing 109 to place locking mechanism 50 in an armed state. In the armed state, plunger 90 engages with lock pins 94 to bias lock pins 94 radially outward to allow hold open rod assembly 28 to be placed in the locked state when panels 13, 15 are again moved to the open position.

As detailed above, hold open rod assembly 28 provides for regulated movement of right-side and left-side panels 13, 15 of a fan cowl. In some embodiments, hold open rod assembly 28 is used on other areas of an aircraft where a panel is to be held in an open position. In some embodiments, hold open rod assembly 28 is used on other land, water, or air bases vehicles. Hold open rod assembly 28 is illustratively formed from rigid materials, such as metal, metal alloys, or plastic for example. In some embodiments, an aluminum alloy and/or stainless steel are used to form some or all of hold open rod assembly 28.

Another embodiment of a hold open rod assembly 228 is shown in FIGS. 13A and 13B. Hold open rod assembly 228 is substantially similar to hold open rod assembly 28. Hold open rod assembly 228 includes an outer tube 230, an inner tube 232, and a locking mechanism 250. Inner tube 232 extends into outer tube 230 and is configured to move relative to outer tube 230 telescopically. In the illustrative embodiment, locking mechanism 250 is coupled to inner tube 232 to move within outer tube 230 as inner tube 232 moves relative to outer tube 230.

Locking mechanism 250 includes a cartridge 264 and set screws 208 configured to couple cartridge 264 with inner tube 232 as suggested in FIG. 14. End plugs 266, 268 are coupled to ends 240, 242 of outer tube 230 and inner tube 232, respectively, to define an internal cavity 260 of hold open rod assembly 228 as suggested in FIGS. 15 and 16. Connection assemblies 246, 247 are attached to end plugs 266, 268.

In the illustrative embodiment, cartridge 264 is received in an internal body 278 formed by inner tube 232. Cartridge 264 includes a casing 292, lock pins 294 which extend into casing 292, and a plunger 290 which extends into casing 292 to engage with lock pins 294 as suggested in FIG. 14. Cartridge 264 is received in internal body 278 such that lock pins 292 extend into openings 296 of internal body 278. A compression spring 236 is coupled between cartridge 264 and internal body 278 to bias plunger 290 toward lock pins 294. Compression spring 236 is positioned between a washer 240 and an annular flange 252 of Plunger 290. An expanding ring 274 is configured to engage with an annular groove 276 formed on internal body 278.

A lock-release sleeve 280 is coupled to a linkage rod 291 by a pin 288 as suggested in FIG. 13B. Pin 288 extends through a slot 286 formed in inner tube 232. Linkage rod 291 is coupled to plunger 290 by a pin 293. Plunger 290 includes a leading end 241 and a trailing end 243 as suggested in FIG. 14. Plunger 290 is formed to include a ramp 261 to engage with lock pins 294 and force lock pins 294 radially outward as plunger 290 is biased toward lock pins 294. Plunger 290 is also formed to include an annular groove 239 to engage with ball bearings 224 of a plunger-motion controller 201 to control movement of plunger 290 relative to casing 292.

Lock pins 294 include a pin head 207 and pin shaft 202 as shown in FIG. 14. Pin head 207 includes a leading surface 265 and a trailing surface 267 opposite of leading surface 265. A beveled edge 264 is formed along a radially outer edge of trailing surface 267. Pin shaft 202 is formed to include an annular groove 200 for engaging with a ball detent assembly 298. Ball detent assembly 298 includes a ball bearing 204 and a washer 217 to hold ball bearing 204 in casing 292. Pin shafts 202 of lock pins 294 are inserted into pin holes 205 formed in casing 292 and plunger 290 is inserted into casing 292.

Casing 292 also includes a stem 210 extending from one side of casing 292 which defines an internal bore 212 for receiving leading end 241 of plunger 290 as suggested in FIG. 14. Plunger-motion controller 201 engages with stem 210 and includes ball bearings 224, a bushing 209, and a compression spring 214. Holes 226 are formed through stem 210 for receiving ball bearings 224. Bushing 209 slides over stem 110 to trap ball bearings 224 between bushing 209 and plunger 290. Bushing 209 includes a sleeve 216 and a flange 218. Compression spring 214 is positioned to surround sleeve 216 and is configured to engage with washer 217 and flange 218 to bias bushing 209 away from casing 292 and bias ball bearing 204 toward pin shaft 202. A retaining ring 220 is coupled to an annular groove 222 formed in stem 210 to retain bushing 209 on stem 210. Bushing 209 is also formed to include an internal annular groove 237 for receiving ball bearings 224.

Hold open rod assembly 228 operates substantially similarly to hold open rod 28. Pin heads 207 slide along internal surface 262 of outer tube 230 as inner tube 232 moves relative to outer tube 230. In a fully extended position, lock pins 294 align with an internal annular groove 263 of outer tube 230 and are forced into groove 263 by plunger 290. Leading surface 265 of pin head 207 engages with a surface 269 of groove 263 to block inner tube 232 from extending back into outer tube 230 and places hold open rod assembly 228 in a locked state to support panels of a fan cowl in an open position. A corresponding surface 273 of opening 296 engages with pin head 207 to counteract compressive forces on hold open rod assembly 228. Lock-release sleeve 280 moves with plunger 290 through connection of pin 288, linkage rod 291, and pin 293 as suggested in FIG. 13B. A corresponding surface 271 of opening 296 engages with pin head 207 to counteract extension forces on hold open rod assembly 228.

Lock-release sleeve 280 limits movement of plunger 290 when pin 288 engages with opposing ends of slot 286. Movement of lock-release sleeve 280 by a user moves plunger 290 relative to lock pins 294 to place hold open rod assembly 228 in an intermediate unlocked state. A user moves lock-release sleeve 280 toward end 242 of inner tube 232 to move plunger 290 as suggested in FIG. 13B.

As lock-release sleeve 280 is pulled to move plunger 290, groove 239 formed near leading end 241 aligns with holes 226. Compression spring 214 biases bushing 209 away from casing 292 to force ball bearing 224 out of groove 237 of bushing 209 and into groove 239 of plunger 290. Sleeve 216 then traps ball bearing 224 in groove 230 such that ball bearing 224 engages with plunger 290 to block movement of plunger 290.

Inner tube 232 is extended away from outer tube 230 to engage beveled edge 264 of pin heads 207 with beveled surface 262 of groove 263. Inner tube 232 is moved until an outer shoulder 276 of internal body 278 engages with an inner shoulder 275 of outer tube 230 such that lock pins 294 are forced radially inward toward plunger 290 to place hold open rod assembly 228 in a fully unlocked state. Groove 200 on pin shaft 202 aligns with ball bearing 204 of ball detent assembly 298 to maintain lock pin 294 in position relative to plunger 290 while hold open rod assembly 228 is in the fully unlocked state so that lock pins 294 do not re-engage groove 263.

Locking mechanism 250 engages with a cylindrical plug extension 270 of end plug 266 when hold open rod assembly 228 is in a fully collapsed position as suggested in FIG. 16. A plate 279 of plug extension 270 engages with bushing 209 to align internal groove 237 with holes 226. Plate 279 is biased toward bushing 209 by a compression spring 277. Compression spring 236 biases plunger 290 toward casing 292 to force ball bearing 224 out of groove 239 and into grove 237 of bushing 209 to place locking mechanism 250 in an armed state. In the armed state, plunger 290 engages with lock pins 294 to bias lock pins 294 radially outward to allow hold open rod assembly 228 to be placed in the locked state again.

A compression spring 289 is coupled to inner tube 232 and engages with pin 188 as suggested in FIGS. 13B and 15. Compression spring 289 and compression spring 277 cooperate to bias hold open rod assembly 228 toward an extended state to assists in initially opening the panels to which hold open rod assemblies 228 are attached.

In illustrative embodiments, a hold open rod assembly which includes at least an outer tubular structure and an inner tubular structure with a locking mechanism carried on the inner tubular structure and interacting with the outer tubular structure to retain the hold open rod assembly in an variety of conditions or states. In one state the tubes are telescopically retracted while in another position the tubes are telescopically extended. The locking mechanism includes structures that facilitate unlocking to retract the inner tube telescopically into the outer tube. The mechanisms also facilitate engagement of lock pins carried on the locking mechanism to engage an inner surface of the outer tube in an extended position. An outer sleeve is attached to the portions of the locking mechanism and is operable relative a portion of the locking mechanism to unlock the mechanism to collapse the rod assembly. Further, the outer sleeve is used to facilitate a "flag" condition which indicates that the locking mechanism is either "locked" or "unlocked" based on the position of the outer sleeve which is also used to achieve the desired condition.

In illustrative embodiments, a hold open rod assembly (sometimes called a strut) is provided which allows for single person operation by sustaining a load while in an intermediate unlocked position. A locking mechanism is mounted inside the strut and allows the strut to be placed in an intermediate unlocked state while sustaining a compression load. The locking mechanism self-resets during retraction of the strut.

In illustrative embodiments, the hold open rod assembly is a metallic tubular design formed from an aluminum alloy and/or stainless steel. The hold open rod assembly includes a sleeve for unlocking the hold open rod assembly even while hold open rod assembly is under compression. The strut is able to support the compressive load even with the sleeve unlocked.

In illustrative embodiments, a user or operator would then lift the fan cowl supported by the strut to fully extend the strut and disengage the locking mechanism. Once the locking mechanism is disengaged, the user is able to close the fan cowl and reset the locking mechanism to an "armed" condition such that it will re-lock once the fan cowl is re-opened. A rubber snubber may be used to laterally pre-load the strut when stowed. Axially pre-loading the strut may not be feasible given the length of travel.

In illustrative embodiments, the strut is movable between a retracted position, an extended position, and a vibe position between the retracted and extended positions. The locking mechanism is fitted on the inner tube as well as an unlocking sleeve. The unlock sleeve can be pulled straight along the inner tube. A flagging system is included to indicate a locked or unlocked condition of the strut to an operator.

In illustrative embodiments, the locking mechanism includes three lock pins that extend outward to lock into a groove formed in the outer tube. The motion of the lock pins is provided by a compression spring acting on a plunger engaged with the lock pins. The unlocking sleeve is engaged with the locking mechanism. A cartridge assembly of the locking mechanism locks the strut once extended and allows the strut to sustain compression and tension loads.

In illustrative embodiments, the plunger is pushed toward the lock pins by the compression spring to pre-load the lock pins outward. Once the lock pins reach a groove in the outer tube the plunger drives the lock pins outward to extend into the groove. The unlocking sleeve is connected to the plunger and moves therewith. Compression and tension forces are transferred across surfaces of the lock pins and groove of the outer tube. A green stripe uncovered by the unlocking sleeve indicates the strut is in a locked condition.

In illustrative embodiments, the unlocking sleeve is pulled to uncover a red stripe indicating the strut is in an unlocked condition. The unlocking sleeve pulls the plunger axially and is kept in place by an inner ball lock mechanism. The lock pins are kept in place by compression loads on the strut and frictional forces with a ball detent assembly.

In illustrative embodiments, the operator lifts the fan cowl to the fully opened position which extends the strut to drive the lock pins inward. The ball detent assembly retains the pin in place so the strut can be retracted. An inner sleeve of the ball lock mechanism contacts a plug of the outer tube as the strut is retracted to reset the locking mechanism. The plunger retracts and is re-armed.

While the present disclosure describes various exemplary embodiments, the disclosure is not so limited. To the contrary, the disclosure is intended to cover various modifications, uses, adaptations, and equivalent arrangements based on the principles disclosed. Further, this application is intended to cover such departures from the present disclosure as come within at least the known or customary practice within the art to which it pertains. It is envisioned that those skilled in the art may devise various modifications and equivalent structures and functions without departing from the spirit and scope of the disclosure as recited in the following claims. The scope of the following claims is to be accorded the broadest interpretation so as to encompass all such modifications and equivalent structures and functions.

The invention claimed is:

1. A hold open rod assembly comprising,
   an outer tube formed to define an internal annular groove,
   an inner tube extending into the outer tube and configured to slide relative to the outer tube between a collapsed position, in which the inner tube is substantially received in the outer tube, and an extended position, in which the inner tube is extended away from the outer tube, and
   a locking mechanism positioned within the outer tube and coupled to the inner tube to move with the inner tube, the locking mechanism including one or more lock pins and a plunger positioned to engage with the one or more lock pins,
   wherein the locking mechanism is movable between an armed state, in which the plunger is biased toward the one or more lock pins and engages with the one or more lock pins to bias the one or more lock pins toward the outer tube in response to the inner tube sliding to the collapsed position, a locked state, in which the one or more lock pins extend into the internal annular groove of the outer tube for engagement with the outer tube in response to the inner tube sliding to the extended position to block sliding of the inner tube relative to the outer tube toward the collapsed position and in which the plunger blocks movement of the one or more lock pins out of the internal annular groove and away from the outer tube, an intermediate unlocked state, in which the plunger is disengaged from the one or more lock pins to allow movement of the one or more lock pins away from the outer tube and in which the one or more lock pins are still in the internal annular groove for engagement with the outer tube to block sliding of the inner tube relative to the outer tube toward the collapsed position, and a fully unlocked state, in which the one or more lock pins move away from the outer tube toward the plunger and out of the internal annular groove in response to sliding of the inner tube away from the collapsed position such that the one or more lock pins are positioned to allow sliding of the inner tube toward the collapsed position.

2. The hold open rod assembly of claim 1, wherein the plunger and the one or more lock pins are part of a cartridge, and wherein the cartridge further includes a casing coupled between the one or more lock pins and plunger.

3. The hold open rod assembly of claim 2, wherein the one or more lock pins extend into the casing in a radial direction and the plunger extends into the casing in an axial direction, wherein the one or more lock pins are slidable relative to the casing along the radial direction, and wherein the plunger is slidable relative to the casing along the axial direction.

4. The hold open rod assembly of claim 3, wherein the plunger forces the one or more lock pins into the internal annular groove of the outer tube in response to the inner tube reaching the extended position where the one or more lock pins are aligned with the internal annular groove.

5. The hold open rod assembly of claim 4, wherein the plunger is formed to include a ramp configured to engage with the one or more lock pins to bias the one or more lock pins radially outward along the radial direction toward the outer tube.

6. The hold open rod assembly of claim 4, further comprising a lock-release sleeve coupled to the plunger and configured to move the plunger relative to the casing at the selection of a user to allow the locking mechanism to move from the locked state to the intermediate unlocked state.

7. The hold open rod assembly of claim 6, further comprising an internal body coupled to the inner tube and configured to receive the cartridge therein.

8. The hold open rod assembly of claim 7, wherein the one or more lock pins extend through the internal body to engage with the outer tube in the locked state of the locking mechanism.

9. The hold open rod assembly of claim 8, further comprising a plunger biaser coupled between the internal body and the plunger and configured to bias the plunger along the axial direction toward the one or more lock pins.

10. The hold open rod assembly of claim 3, wherein the cartridge further includes a stem extending away from the casing and a plunger-motion controller engaged with the stem and the plunger and configured to control motion of the plunger relative to the casing between the fully unlocked state and the armed state of the locking mechanism.

11. The hold open rod assembly of claim 10, wherein the plunger-motion controller includes a bushing positioned to surround the stem, one or more ball bearings received in one or more holes extending through the stem, and a compression spring positioned between the bushing and the casing to bias the bushing away from the casing.

12. The hold open rod assembly of claim 6, wherein inner tube is configured to receive the cartridge therein.

13. The hold open rod assembly of claim 12, wherein the one or more lock pins extend through the inner tube to engage with the outer tube in the locked state of the locking mechanism.

14. The hold open rod assembly of claim 13, further comprising a plunger biaser coupled between the inner tube and the plunger and configured to bias the plunger along the axial direction toward the one or more lock pins.

15. The hold open rod assembly of claim 12, wherein the cartridge further includes a stem extending away from the casing and a plunger-motion controller engaged with the stem and the plunger and configured to control motion of the plunger relative to the casing between the fully unlocked state and the armed state of the locking mechanism.

16. The hold open rod assembly of claim 15, wherein the plunger-motion controller includes a bushing positioned to surround the stem, one or more ball bearings received in one or more holes extending through the stem, and a compression spring positioned between the bushing and the casing to bias the bushing away from the casing.

17. A hold open rod assembly comprising,
an outer tube having a first end and a second end spaced apart from the first end, the first end configured to receive an end plug and the second end formed to include an internal annular groove,
an inner tube having a first end and a second end spaced apart from the first end, the second end configured to extend into the outer tube, the inner tube configured to slide relative to the outer tube between a collapsed position, in which the inner tube is substantially received in the outer tube and the second end of the inner tube is positioned adjacent the first end of the outer tube, and an extended position, in which the inner tube is extended away from the outer tube and the second end of the inner tube is positioned adjacent the second end of the outer tube, and
a locking mechanism positioned within the outer tube and coupled to the inner tube to move with the inner tube, the locking mechanism including a casing, one or more lock pins extending into the casing in a radial direction, a plunger extending into the casing in an axial direction, and a plunger-motion controller coupled to the casing and engaged with the plunger,
wherein the locking mechanism is movable between an armed state, in which the plunger is biased toward the one or more lock pins and engages with the one or more lock pins to bias the one or more lock pins toward the outer tube in response to the inner tube sliding to the collapsed position, a locked state, in which the one or more lock pins extend into the internal annular groove of the outer tube for engagement with the outer tube in response to the inner tube sliding to the extended position to block sliding of the inner tube relative to the outer tube toward the collapsed position and in which the plunger blocks movement of the one or more lock pins out of the internal annular groove and away from the outer tube, an intermediate unlocked state, in which the plunger is disengaged from the one or more lock pins and blocked from movement along the axial direction by the plunger-motion controller to allow movement of the one or more lock pins away from the outer tube and in which the one or more lock pins are still in the internal annular groove for engagement with the outer tube to block sliding of the inner tube relative to the outer tube toward the collapsed position, and a fully unlocked state, in which the one or more lock pins move away from the outer tube toward the plunger and out of the internal annular groove in response to sliding of the inner tube away from the collapsed position such that the one or lock more pins are positioned to allow sliding of the inner tube toward the collapsed position, and the locking mechanism is movable from the fully unlocked state to the armed state in response to the plunger-motion controller engaging with the end plug of the outer tube.

18. A method of operating a hold open rod assembly, wherein the hold open rod assembly includes an inner tube, an outer tube, a locking mechanism, and a lock-release sleeve, the method comprising:
sliding the inner tube relative to the outer tube toward an extended position,
moving one or more lock pins of the locking mechanism into an internal annular groove of the outer tube for engagement with the outer tube to place the hold open rod assembly in a locked state, in which sliding of the inner tube from the extended position toward a collapsed position is blocked, a plunger of the locking mechanism is engaged with the one or more lock pins so as to block movement of the one or more lock pins out of the internal annular groove and away from the outer tube when the hold open rod assembly is in the locked state,
sliding the lock-release sleeve relative to the inner tube to slide the plunger relative to the one or more lock pins to disengage the plunger from the one or more lock pins and place the hold open rod assembly in an intermediate unlocked state, in which the one or more lock pins are still in the internal annular groove for engagement with the outer tube to block sliding of the inner tube from the extended position toward the collapsed position, sliding the inner tube relative to the outer tube away from the collapsed position to move the one or more lock pins out of the internal annular groove to place the hold open rod assembly in a fully unlocked state, in which the one or more lock pins are positioned to allow the inner tube to slide relative to the outer tube toward the collapsed position, and sliding the inner tube toward the collapsed position to engage the locking mechanism with an end plug coupled to the outer tube to allow re-engagement of the plunger with the one or more lock pins for biasing the one or more lock pins toward the outer tube.

19. The method of claim 18, wherein the one or more lock pins are engaged with the outer tube and the plunger is maintained in a spaced apart relation to the one or more lock pins when the hold open rod assembly is in the intermediate unlocked state.

\* \* \* \* \*